US009542804B2

(12) United States Patent
Carr-Gregg

(10) Patent No.: US 9,542,804 B2
(45) Date of Patent: Jan. 10, 2017

(54) SESSION MONITORING ON GAMING MACHINES

(71) Applicant: Aristocrat Technologies Australia Pty Limited, North South Ryde NSW (AU)

(72) Inventor: John Francis Cromwell Carr-Gregg, Gordon (AU)

(73) Assignee: Aristocrat Technologies Australia Pty Limited, North Ryde, NSW (AU)

( * ) Notice: Subject to any disclaimer, the term of this patent is extended or adjusted under 35 U.S.C. 154(b) by 0 days.

(21) Appl. No.: 13/664,910

(22) Filed: Oct. 31, 2012

(65) Prior Publication Data

US 2013/0122997 A1 May 16, 2013

Related U.S. Application Data

(63) Continuation of application No. 12/368,169, filed on Feb. 9, 2009, now Pat. No. 8,323,109.

(30) Foreign Application Priority Data

Feb. 8, 2008 (AU) ................................ 2008900596

(51) Int. Cl.
*G06F 17/00* (2006.01)
*G06F 19/00* (2011.01)
*G07F 17/32* (2006.01)

(52) U.S. Cl.
CPC ....... *G07F 17/3251* (2013.01); *G07F 17/3234* (2013.01); *G07F 17/3237* (2013.01); *G07F 17/3239* (2013.01); *G07F 17/3225* (2013.01)

(58) Field of Classification Search
CPC .............. G07F 17/3227; G07F 17/3237; G07F 17/3239
USPC ...................................................... 463/24, 29
See application file for complete search history.

(56) References Cited

U.S. PATENT DOCUMENTS

| | | | | |
|---|---|---|---|---|
| 5,933,818 | A * | 8/1999 | Kasravi et al. | 706/12 |
| 6,110,041 | A | 8/2000 | Walker et al. | |
| 6,634,942 | B2 | 10/2003 | Walker et al. | |
| 6,811,486 | B1 * | 11/2004 | Luciano, Jr. | 463/24 |
| 6,884,172 | B1 | 4/2005 | Lloyd et al. | |
| 6,896,618 | B2 | 5/2005 | Benoy et al. | |
| 6,916,244 | B2 | 7/2005 | Gatto et al. | |
| 7,182,690 | B2 | 2/2007 | Giobbi et al. | |
| 7,607,981 | B2 | 10/2009 | Walker et al. | |
| 7,874,914 | B2 | 1/2011 | Walker et al. | |
| 7,905,778 | B2 | 3/2011 | Breckner et al. | |
| 7,909,693 | B2 * | 3/2011 | Kammler et al. | 463/25 |
| 7,922,578 | B2 * | 4/2011 | Okuniewicz | 463/25 |
| 7,951,008 | B2 | 5/2011 | Wolf et al. | |
| 8,597,110 | B2 * | 12/2013 | Kammler et al. | 463/25 |

(Continued)

FOREIGN PATENT DOCUMENTS

| | | |
|---|---|---|
| AU | 2007216754 | 4/2008 |
| WO | 2005034053 | 4/2005 |
| WO | 2006107068 | 10/2006 |

*Primary Examiner* — Steven J Hylinski
(74) *Attorney, Agent, or Firm* — Armstrong Teasdale LLP

(57) ABSTRACT

A method, gaming machine and gaming system is described that provides for session information monitoring. Session information is formed by monitoring play of a game by a player on a gaming machine. At the option of the player of the gaming machine the session information is either combined with session information from another gaming machine, or is not combined.

11 Claims, 5 Drawing Sheets

(56) References Cited

U.S. PATENT DOCUMENTS

| | | | | |
|---|---|---|---|---|
| 8,597,116 | B2* | 12/2013 | Nguyen et al. | 463/29 |
| 2002/0087496 | A1 | 7/2002 | Stirpe et al. | |
| 2002/0129368 | A1 | 9/2002 | Schlack et al. | |
| 2002/0142825 | A1 | 10/2002 | Lark et al. | |
| 2003/0186747 | A1 | 10/2003 | Nguyen et al. | |
| 2004/0147311 | A1 | 7/2004 | Fujimoto | |
| 2004/0219967 | A1 | 11/2004 | Giobbi et al. | |
| 2005/0010738 | A1 | 1/2005 | Stockdale et al. | |
| 2005/0054427 | A1 | 3/2005 | Toyoda | |
| 2005/0054446 | A1 | 3/2005 | Kammler et al. | |
| 2005/0119052 | A1 | 6/2005 | Russell et al. | |
| 2005/0137016 | A1 | 6/2005 | Enzminger et al. | |
| 2005/0164766 | A1 | 7/2005 | Haim et al. | |
| 2005/0170892 | A1 | 8/2005 | Atkinson | |
| 2005/0261058 | A1 | 11/2005 | Nguyen et al. | |
| 2006/0154724 | A1* | 7/2006 | Okuniewicz | 463/29 |
| 2006/0160620 | A1 | 7/2006 | Matthews et al. | |
| 2006/0281554 | A1 | 12/2006 | Gatto et al. | |
| 2006/0287038 | A1 | 12/2006 | Walker et al. | |
| 2007/0078986 | A1 | 4/2007 | Ethier et al. | |
| 2007/0117623 | A1 | 5/2007 | Nelson et al. | |
| 2007/0173313 | A1 | 7/2007 | Bienvenue | |
| 2007/0259709 | A1 | 11/2007 | Kelly et al. | |
| 2007/0270213 | A1 | 11/2007 | Nguyen et al. | |
| 2008/0042354 | A1 | 2/2008 | Yoseloff et al. | |
| 2008/0085772 | A1 | 4/2008 | Iddings et al. | |
| 2008/0113772 | A1* | 5/2008 | Burrill et al. | 463/25 |
| 2008/0261685 | A1 | 10/2008 | Muir | |
| 2009/0069087 | A1 | 3/2009 | Kelly et al. | |
| 2009/0093300 | A1 | 4/2009 | Lutnick et al. | |
| 2009/0104963 | A1 | 4/2009 | Burman et al. | |
| 2009/0104965 | A1 | 4/2009 | House et al. | |
| 2009/0124350 | A1 | 5/2009 | Iddings et al. | |
| 2009/0124376 | A1* | 5/2009 | Kelly et al. | 463/29 |

* cited by examiner

SESSION MONITORING ON GAMING MACHINES

RELATED APPLICATIONS

This application claims priority to Australian Provisional Patent Application No. 2008900596, having a filing date of Feb. 8, 2008, which is incorporated herein by reference in its entirety.

FEDERALLY SPONSORED RESEARCH OR DEVELOPMENT

[Not Applicable]

MICROFICHE/COPYRIGHT REFERENCE

[Not Applicable]

FIELD OF THE INVENTION

The present invention generally relates to gaming machines and methods of gaming.

BACKGROUND OF THE INVENTION

With the increase of gambling at gaming venues has come increased competition between gaming venues to obtain a larger share of the total gambling spend. Gaming venue operators have therefore continuously looked for new variations and types of games in order to attract both new and return customers to their venues.

When making purchase decisions, gaming venue operators may therefore look for gaming machines with new functionality. However, the requirement for new functionality may need to be balanced by a requirement for the gaming machines to be readily understandable. In addition, players of gaming machines may be influenced in their decision as to which games to play by the functionality provided by the gaming machine, including the type of game provided by the gaming machine, the way that the gaming machine presents the game, and other features provided by the gaming machine.

BRIEF SUMMARY OF THE INVENTION

According to one aspect of the invention, there is provided a method implemented using a gaming system including a plurality of gaming machines that are each arranged to provide a game by determining a game outcome, presenting selected symbols on a display representative of the game outcome, and awarding an award if the game outcome is a winning outcome, the method including:

monitoring play by a player of the game to form session information; and providing an option to the player to either combine the session information with session information from another gaming machine or not.

In one embodiment, the option is provided when the player ends play of the game on the gaming machine. If the player selects to combine the session information with session information from another gaming machine, the method may include storing the session information associated with an identifier (e.g. a PIN) and providing the player with an identifier. The method may then include providing at least the option to combine the session information with said session information from another gaming machine when the player provides the identifier at that other gaming machine. In one implementation of this embodiment, the session information and the session information from another gaming machine may be automatically combined when the player provides the identifier at the other gaming machine.

In one embodiment, the option is provided at the commencement of or during play of the other gaming machine. The method may include storing the session information with an identifier, wherein the option is provided following receipt at the other gaming machine of the identifier.

According to another aspect of the invention, there is provided a gaming system comprising a plurality of gaming machines and an electronic communication and storage device in communication with the gaming machines, each gaming machine providing a game in which a plurality of symbols are selected and presented on a display and if a winning combination occurs, the gaming machine awards an award;

wherein the gaming machine monitors play of its respective game during a game play by a player of that gaming machine and session information relating to the game play is communicated to and stored by the electronic communication and storage device associated with an identifier; and wherein at the option of the player, the session information is combined with session information from another gaming machine by a player that provides the identifier at that other gaming machine.

In one embodiment, at the end of game play on the gaming machine, the player is provided with an option to retain the session information. If the player elects to retain the session information, the session information is available for combination with the session information from the other gaming machine. In one implementation, the session information may be automatically combined with the session information from the other gaming machine. In one implementation, the option is provided to the player at the commencement of play of the other gaming machine. Alternatively, the option is provided to the player during play of the other gaining machine when the player provides the identifier.

In one embodiment, the gaming machine is operable by the player substantially at any time during play of a gaming machine to designate an end of a gaming session and commence a new gaming session, in which the monitored play from the ended gaming session is not considered for the formation of the session information for the new gaming session. In this embodiment, the option may be available in respect of the session information for the new gaming session.

According to another aspect of the invention, there is provided a gaming machine including a communication interface to allow communication with a remote electronic communication and storage device, the gaming machine providing a game in which a plurality of symbols are selected and presented on a display and if a winning combination occurs, the gaming machine awards an award;

wherein the gaming machine monitors play of the game by a player and is operable to form session information relating to the monitored game play and communicate the session information via the communication interface; and wherein at the end of a gaming session, the player is provided the option of retaining the session information for combination with session information from a subsequent gaming session and if the player chooses that option, the session information is communicated through the communication interface and an identifier associated with the session information is provided to the player.

Further aspects of the present invention will be apparent from the following description, given by way of example and with reference to the accompanying drawings. Also, various embodiments of the aspects described in the preceding paragraphs will be apparent from the appended claims, the following description and/or the accompanying drawings.

DETAILED DESCRIPTION OF THE INVENTION

Figure 1:
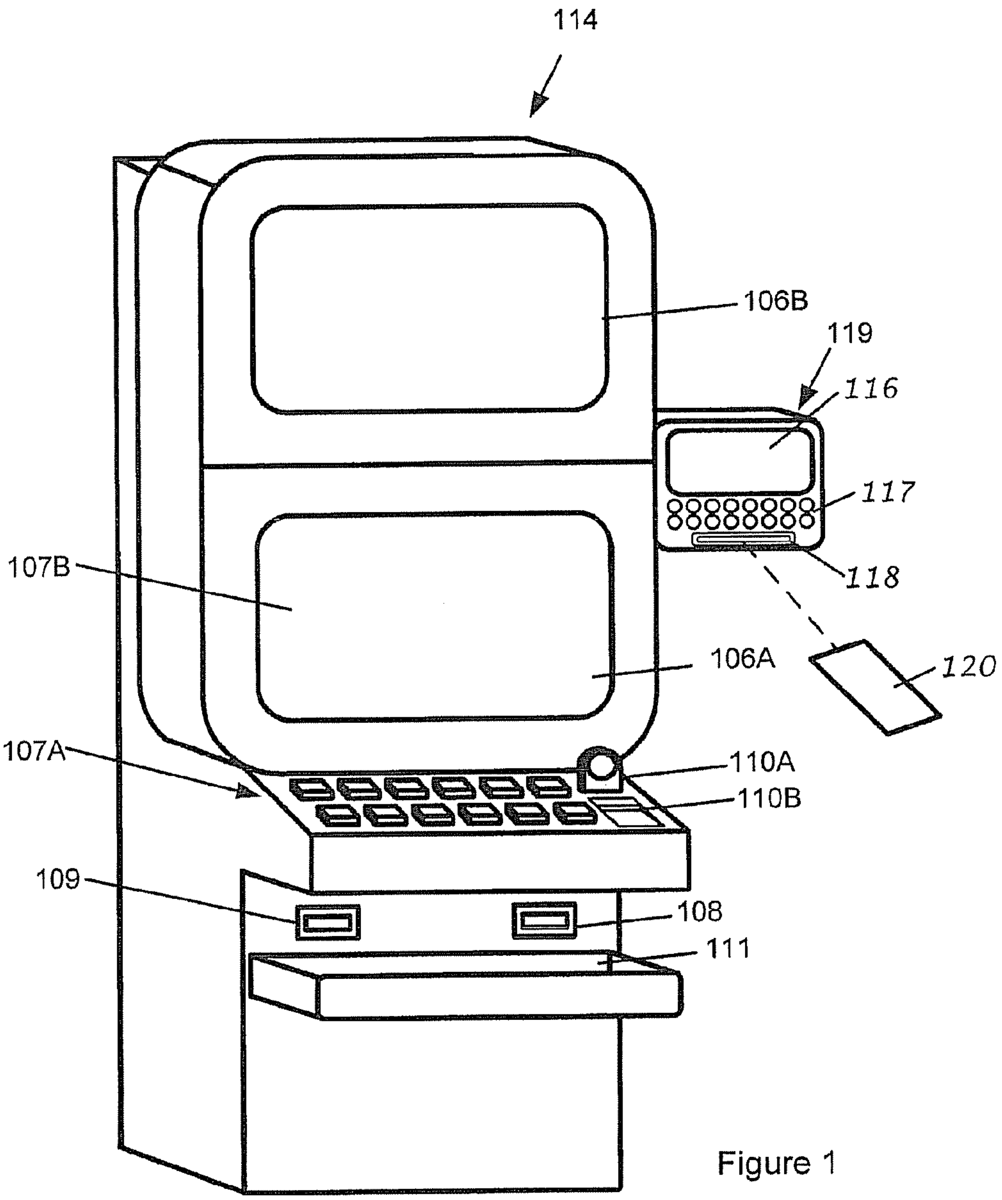
FIG. 1: shows diagrammatically, a view of a gaming console suitable for implementing the present invention.

In FIG. 1 of the accompanying drawings, one example of a gaming console that is suitable to implement the present invention is generally referenced by arrow 114.

The gaming console 114 includes two displays 106A, 106B on one or both of which is displayed representations of a game that can be played by a player and a bank of buttons 107A and/or a touch screen 107B to enable a player to play the game. The displays 106 may be video display units, such as a cathode ray tube screen device, a liquid crystal display, plasma screen, any other suitable video display unit, or the visible portion of an electromechanical device. The display 106B may display artwork, including for example, pay tables and details of bonus awards and other information or images relating to the game. In alternative gaming consoles the display 106B may be omitted, optionally replaced by a static display.

A credit input including a coin input 110A and/or bill collector 110B allows a player to provide credit for wagering and a coin output 111 is provided for cash payouts from the gaming console 114. A card and/or ticket reader 108 and a printer 109 may be provided to provide player monitoring, cashless game play or other gaming and non-gaming related functions.

A player tracking module (PTM) 119 is attached to a side of the console 114. The PTM 119 includes an electronic display 116 and may also include a keypad 117 and a card reader 118, which may also be a ticket reader or may be solely a ticket reader. The display 116 may, for example, be a LCD display or other video display, or may be a LED display. As explained in more detail herein below, the card reader 118 may allow player identification through the insertion of a player card 120 including a machine readable player identifier. Typically only one of the readers 108, 118 are provided on a single gaming console to perform all card and ticket reading functions.

Figure 2:
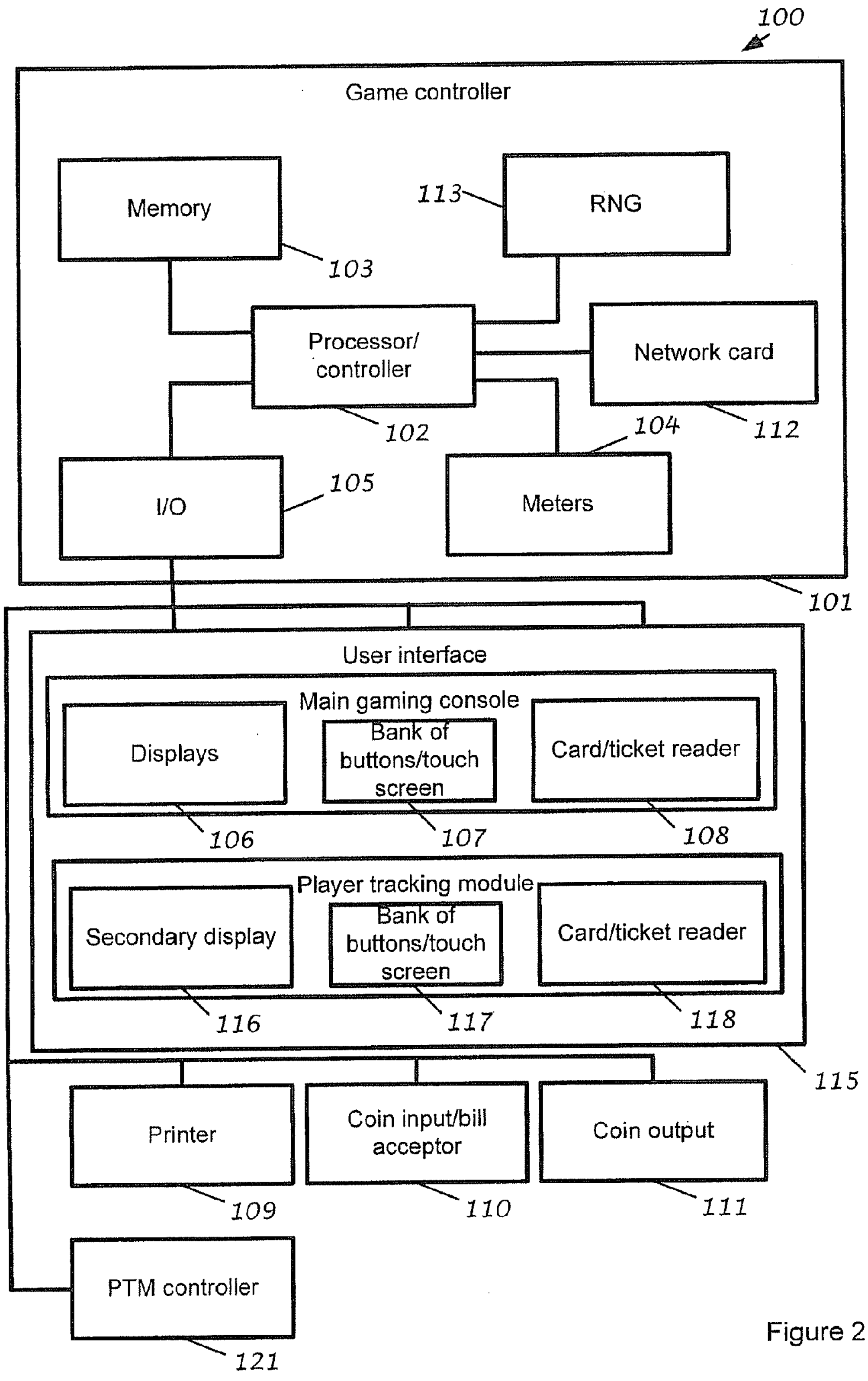
FIG. 2: shows a block diagram of gaming machine suitable for implementing the present invention.

FIG. 2 shows a block diagram of a gaming machine, generally referenced by arrow 100, suitable for implementing the present invention. The gaming machine 100 may include the gaming console 114 shown in FIG. 1 and accordingly like reference numerals have been used to describe like components in FIGS. 1 and 2.

The gaming machine 100 includes a game controller 101, which in the illustrated example includes a computational device 102, which may be a microprocessor, microcontroller, programmable logic device or other suitable device. Instructions and data to control operation of the computational device 102 are stored in a memory 103, which is in data communication with, or forms part of, the computational device 102. Typically, the gaming machine 100 will include both volatile and non-volatile memory and more than one of each type of memory, with such memories being collectively represented by the memory 103. The instructions to cause the game controller 101 to implement the present invention will be stored in the memory 103. The instructions and data for controlling operation of the computational device 102 may be stored on a computer readable medium from which they are loaded into the gaming machine memory 103. The instructions and data may be conveyed to the gaming machine by means of a data signal in a transmission channel. Examples of such transmission channels include network connections, the Internet or an intranet, and wireless communication channels.

The game controller 101 may include hardware credit meters 104 for the purposes of regulatory compliance and also include an input/output (110) interface 105 for communicating with the peripheral devices of the gaming machine 100. The input/output interface 105 and/or the peripheral devices may be intelligent devices with their own memory for instructions and data.

In the example shown in FIG. 2, the peripheral devices that communicate with the controller are the displays 106, a bank of buttons/touch screen 107, the card and/or ticket reader 108, the printer 109, a bill acceptor and/or coin input 110 and a coin output 111. Additional devices may be included as part of the gaming machine 100, or devices omitted as required for the specific implementation.

The bank of buttons 107A and/or touch screen 107B together with one or both of the displays 106 and the interface of the PTM 119 may provide a user interface 115 through which the gaming machine 100 and player communicate. If a card/ticket reader 108 is provided, this may also form part of the user interface 115. In addition, the user interface may also include components of the PTM 119, including the display 116, bank of buttons/touch screen 117 and the card and/or ticket reader 118.

In addition, the gaming machine 100 may include a communications interface, for example a network card 112. The network card 112, may for example, send status information, accounting information or other information to a central controller, server or database and receive data or commands from the central controller, server or database. The network card 112 may also enable communication with a central player account, allowing cashless gaming. One or more of the peripheral devices, for example the card/ticket reader 108 may be able to communicate directly with the network card 112. The network card 112 and the I/O interface 105 may be suitably implemented as a single machine communications interface. The PTM 119 has a PTM controller 121 that may have a direct communication line with the network card 112 and may also communicate with the game controller 101 through the I/O interface 105. The network card 112 and the I/O interface 105 may be suitably implemented as a single device in the form of a machine communications interface.

The game controller 101 may also include a random number generator 113, which generates a series of random numbers that are used by the computational device 102 to determine the outcomes of games played on the gaming machine 100.

The game controller 101 may have distributed hardware and software components that communicate with each other directly or through a network or other communication channel. The game controller 101 may also be located in part or in its entirety remote from the user interface 115. Also, the computational device 102 may comprise a plurality of devices, which may be local or remote from each other. Instructions and data for controlling the operation of the user interface 115 may be conveyed to the user interface 115 by means of a data signal in a transmission channel. The user interface 115 may be a computational device, for example a personal computer, used by a person to play a game provided from a remote game controller 101.

Figure 3:
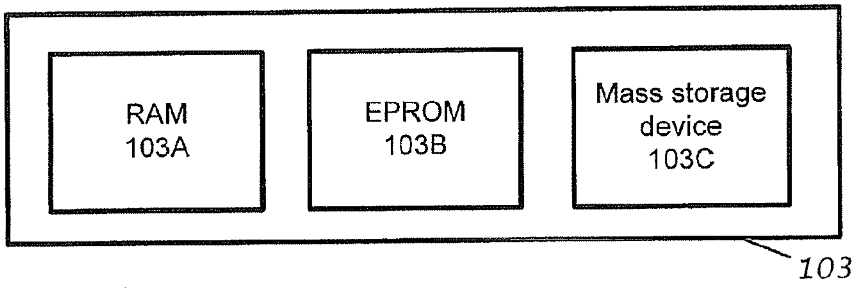
FIG. 3: shows a block diagram of components of the memory of the gaming machine represented in FIG. 2.

FIG. 3 shows an exemplary block diagram of the main components of the memory 103. The RAM 103A typically temporarily holds instructions and data related to the execution of game programs and communication functions performed by the computational controller 102. The EPROM 103B may be a boot ROM device and/or may contain system and game related code. The mass storage device 103C may be used to store game programs, the integrity of which may be verified and/or authenticated by the computational controller 102 using protected code from the EPROM 103B or elsewhere.

Figure 4:
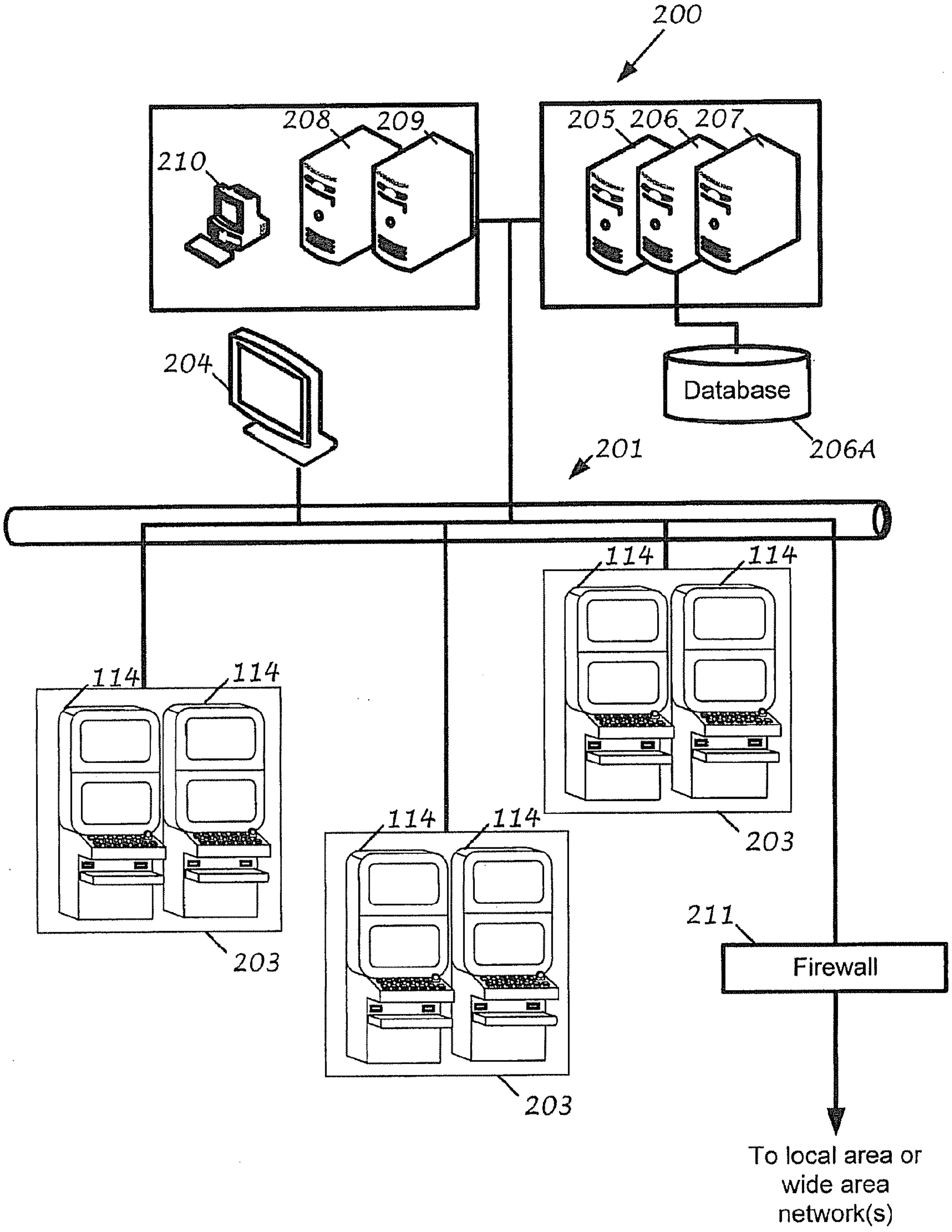
FIG. 4: shows diagrammatically, a network gaming system suitable for implementing the present invention.

FIG. 4 shows a gaming system 200 in the form of a network of devices. The gaming system 200 includes a network infrastructure 201, which for example may be in the form of an Ethernet network. Alternatively, a wireless network and/or direct communication channels, or a different type of network may be used to link the gaming machines to a server, each other and/or other devices. Gaming consoles 114, shown arranged in three banks 203 of two gaming consoles 114 in FIG. 4, are connected to the network infrastructure 201. The gaming consoles 114 may form part or all of a gaming machine 100. Single gaming consoles 114 and banks 203 containing three or more gaming devices 202 may also be connected to the network infrastructure 201, which may also include bank controllers, hubs, routers, bridges to other networks and other devices (not shown).

One or more displays 204 may also be connected to the network 201. The displays 204 may, for example, be associated with a bank 203 of gaining consoles 114. The displays 204 may be used to display representations associated with game play on the gaming devices 202, and/or used to display other representations, for example promotional or informational material.

Servers may also be connected to the network 201. For example, a game server 205 may generate game outcomes for games played on one or more of the gaming consoles 114, a database management server 206 may manage the storage of game programs and associated data in a database 206A so that they are available for downloading to, or access by, game controllers 101, and a jackpot server 207 may control one or more jackpots for the gaming system 200.

Further servers may be provided to assist in the administration of the gaming system 200, including for example a gaming floor management server 208, and a licensing server 209 to monitor the use of licenses to particular games. An administrator terminal 210 is provided to allow an administrator to manage the network 201 and the devices connected to the network. The different servers depicted can be distinct physical servers or logically distinct server processes running on a single physical server.

The gaming system 200 may communicate with other gaming systems, other local networks, for example a corporate network and/or a wide area network such as the Internet through a firewall 211.

The process of the present invention may be performed by the gaming system 200, in which the gaming consoles 114 each include game controllers 101 to form gaming machines 100 and the following description assumes this implementation. However, those skilled in the relevant arts will appreciate that the process will also be able to be implemented by other gaming systems.

The PTM controller 121 monitors the card reader 118 for the insertion of a player card 120. When a player card 120 is inserted, the card reader 118 reads a player identifier and the PTM controller 121 communicates this to the network card 112 for communication to the floor management server 208 together with information to identify the PTM 119 and/or console 114 at which the player inserted their player card 120. As explained in more detail later herein, the floor management server 208 stores in a database records of players.

In response to receipt of the player identifier, the floor management server 208 retrieves the records associated with that player identifier. These records may include an account balance for the player, preferences of the player and other information. In an embodiment of the present invention, the records include past and/or current session information.

The present invention involves monitoring a session of play of games on the gaming consoles 114. The information monitored in a session may vary depending on the particular implementation of the invention, but may include any one or combination of: accumulated cash in, accumulated credits played, accumulated credits won, session total balance (credits played less credits won), and session start time and date.

Figure 5:
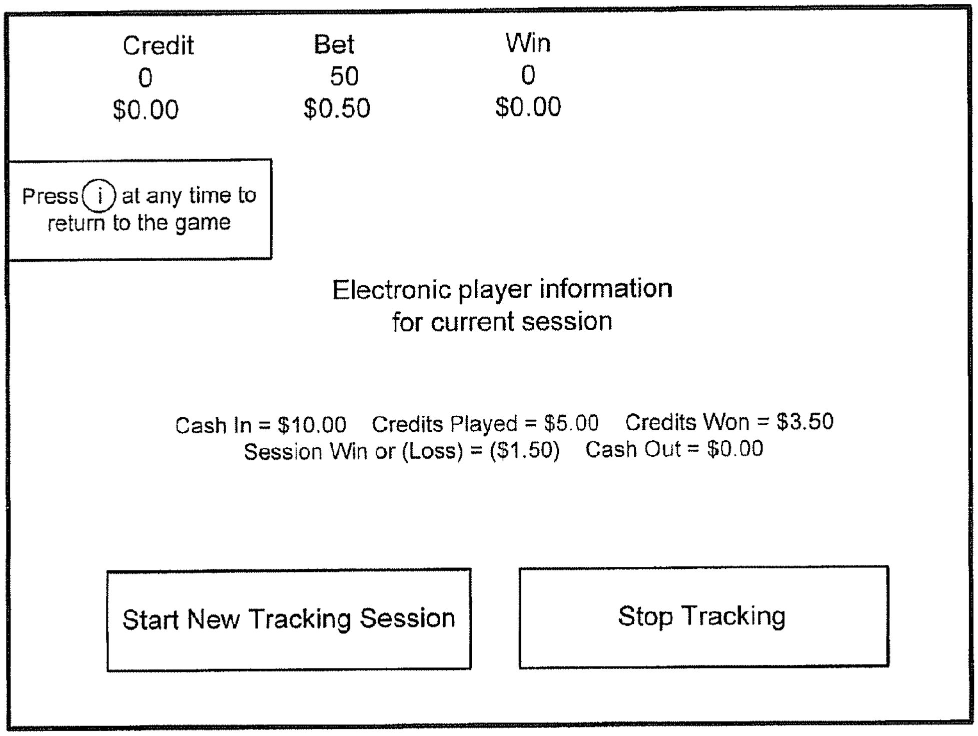
FIG. 5: shows a screen display displaying session information.

FIG. 5 shows a screen display showing session information. The session information may be displayed on the display 116 of the PTM 119 or on another display, for example a display 106 of the gaming console 114. If the information is displayed on a display of the gaming console, the display 116 of the PTM 119 may be omitted, or the PTM 119 omitted in its entirety. If the PTM 119 is omitted in its entirety, a different method of identifying the player will be required. Other methods of player identification that may be used include using a pin, or biometric information.

In the example shown in FIG. 5 the player is provided with session information including 'Cash In', 'Credits Played', 'Credits Won', 'Session Win or (Loss)', 'Cash Out', 'Session Started' and 'Total Time Played'. In addition, the current time and credits available for play are displayed. The screen display shown in FIG. 5 may be displayed on request, for example by the player selecting an icon from an information menu. In addition it may be displayed automatically on certain events. For example, if the retrieved player records indicate that the player has a current session, then the screen display shown in FIG. 5 may be displayed automatically following insertion of the player card 120. In other embodiments, if there is a current session, recording of play to that session may occur without displaying the screen display shown in FIG. 5.

The screen display includes two options 'Start New Tracking Session' and 'Stop Tracking', which may be selected by pressing an icon or button in the bank of buttons/touch screen 107, or bank of buttons/touch screen 117 of the gaming console 114 or PTM 119 respectively. The 'Start New Tracking Session' allows the player to stop recording the current session, which may be either stored by the floor management server 208 in an appropriate database, or deleted. A new session is then commenced with the session information reset. The 'Stop Tracking' selection allows a player to play a game on the gaming console 114 without that game play being recorded as part of a session. After selecting this option, the screen display may include as options the 'Start New Tracking Session' option described and 'Start Tracking', with the later option resuming monitoring to the session that was stopped. Alternatively, after selecting 'Stop Tracking' the player may only have an option to start a new session.

In order for session monitoring to be performed, the player may have to indicate this, for example by selecting the 'Start New Tracking Session' monitoring icon from the screen display shown in FIG. 5. Alternatively, session monitoring may commence automatically each time a player provides 'Cash In' at a gaming console 114.

As the player plays a game on the gaming console 114, information relevant to the session information is communicated to the gaming floor management server 208. This communication may be in real time, on a batch basis, or on the occurrence of a particular event—for example on providing a cash out command, or the player requesting display of the session information display screen shown in FIG. 5. The gaming floor management server 208 accumulates counters and timers as required to maintain the session information. Session monitoring may instead be performed by the gaming machine 100 and session information only communicated to the gaming floor management server 208 (or other central location) when the player cashes out and chooses to retain the session (see herein below).

In another embodiment, where the player uses a player card 120 that can record information, the session information may be written to the player card 120. In still another embodiment, the session information may be written to a ticket that is printed by the printer 109.

Figure 6:
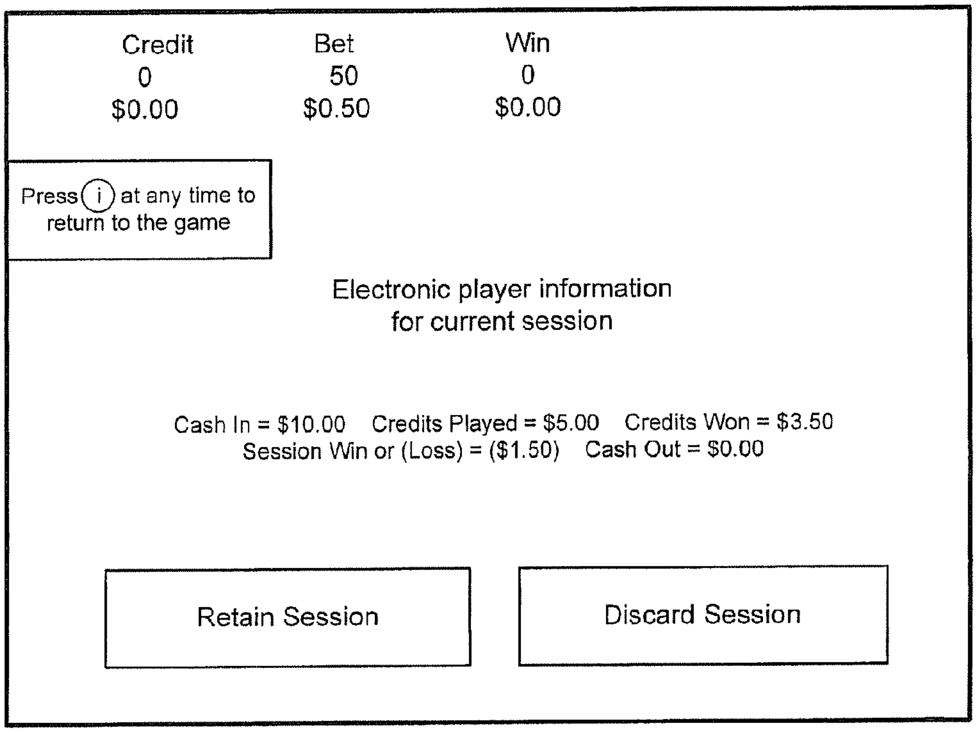
FIG. 6: shows a screen display displaying a 'Retain Session' and a 'Discard Session' option.

When the player indicates that they will be leaving the gaming console 114, for example by selecting a cash out option, the gaming machine displays a message that asks whether the player wishes to retain the current session or not. An example is shown in the screen display of FIG. 6, where the two options are 'Retain Session' and 'Discard Session'. If the 'Retain Session' option is selected, then the session information is recorded to allow it to be subsequently retrieved and combined with session information from another gaming console 114. As discussed above, the recording may be performed centrally by the floor management server 208, or by writing the information onto a ticket or a player card. This act of recording may be used as an indication that the player wishes to retain the session. Alternatively, a flag associated with the recorded data may be set, which is used to indicate the player's choice to retain the session.

If the 'Retain Session' option was selected, when the player commences play of another gaming console 114 by entering their player card, ticket or other identifier, then the retained session is retrieved and information regarding game play on the other gaming console 114 is added to that session information. The player therefore is provided with control over the start and end times of the sessions that are recorded. This is in contrast to other systems that may perform player tracking for purposes such as accruing loyalty points that can be redeemed for rewards. These loyalty programs monitor player information over all sessions of play and accordingly provide little if any feedback to players on any particular session.

Sometimes a player may have indicated in the end of a previous session that he or she wanted the session to be retained, but the player may commence another session at a new gaming console 114 without identifying themselves. The player may subsequently identify themselves at the new gaming console 114. In this situation, the session information may only be updated in response to game play after the player identified themselves at the new gaming console 114.

Alternatively, the gaming floor management server 208 may record all sessions regardless of whether or not a player has been identified, associating the gaming session with the gaming console 114 that is being played. If the player subsequently identifies themselves and the records maintained by the gaming floor management server 208 (or received by the gaming console 114 via a card or ticket) indicate that they have a retained session, then the gaming floor management server 208 can combine the session information from the current session with the session information from the retained session. If the gaming machine 100 maintains the current session instead of the gaming floor management server 208, then this may be achieved by communicating the retained session information to the gaming machine 100, and the gaming machine 100 updating its locally stored session information to combine the retained session with the current session.

In one embodiment, players can retain their sessions without a player card, ticket or other physical identifier. In this embodiment, as in the previously described embodiments, at the end of the gaming session, the player is asked whether they wish to retain the session. If the player selects that they do wish to retain the session, the gaming console 114 displays on a display a PIN. When the player starts play of another gaming console 114, the player operates the user interface 115 to enter the PIN. The PIN is then used by the gaming floor management server 208 to identify the relevant session information and the current session and retained session are combined.

The use of a PIN in this manner or the use of a ticket as a player identifier allows a player to record session information anonymously. Anonymous session monitoring may be achieved using a player card if no personal information or any identifying information (other than session information) is included on the card.

While the embodiments described herein above ask the player whether she or he wishes to retain their session when ending a session, for example by cashing out of a gaming console 114, in an alternative embodiment this question may be provided to the player when commencing a new session. In this embodiment all gaming sessions by identified players are recorded by the gaming floor management server 208 until the player starts another session. If the player chooses to retain the previous session, it is combined with the current session information. If the player chooses not to retain the previous session, then the previous session may be deleted, to be replaced with the session information from the current session when the current session ends.

Session information may be associated with a time and set to expire after a certain duration has elapsed. For example, if retained session information becomes more than 24 hours old without being retrieved and combined with another session, then it may be deleted, or alternatively it may be stored with its status changed to indicate that it is a historical record. Such historical records may not be able to be combined with session information from a current session. Other expiration periods may be provided, for example a week, a month or a year.

Figure 7:
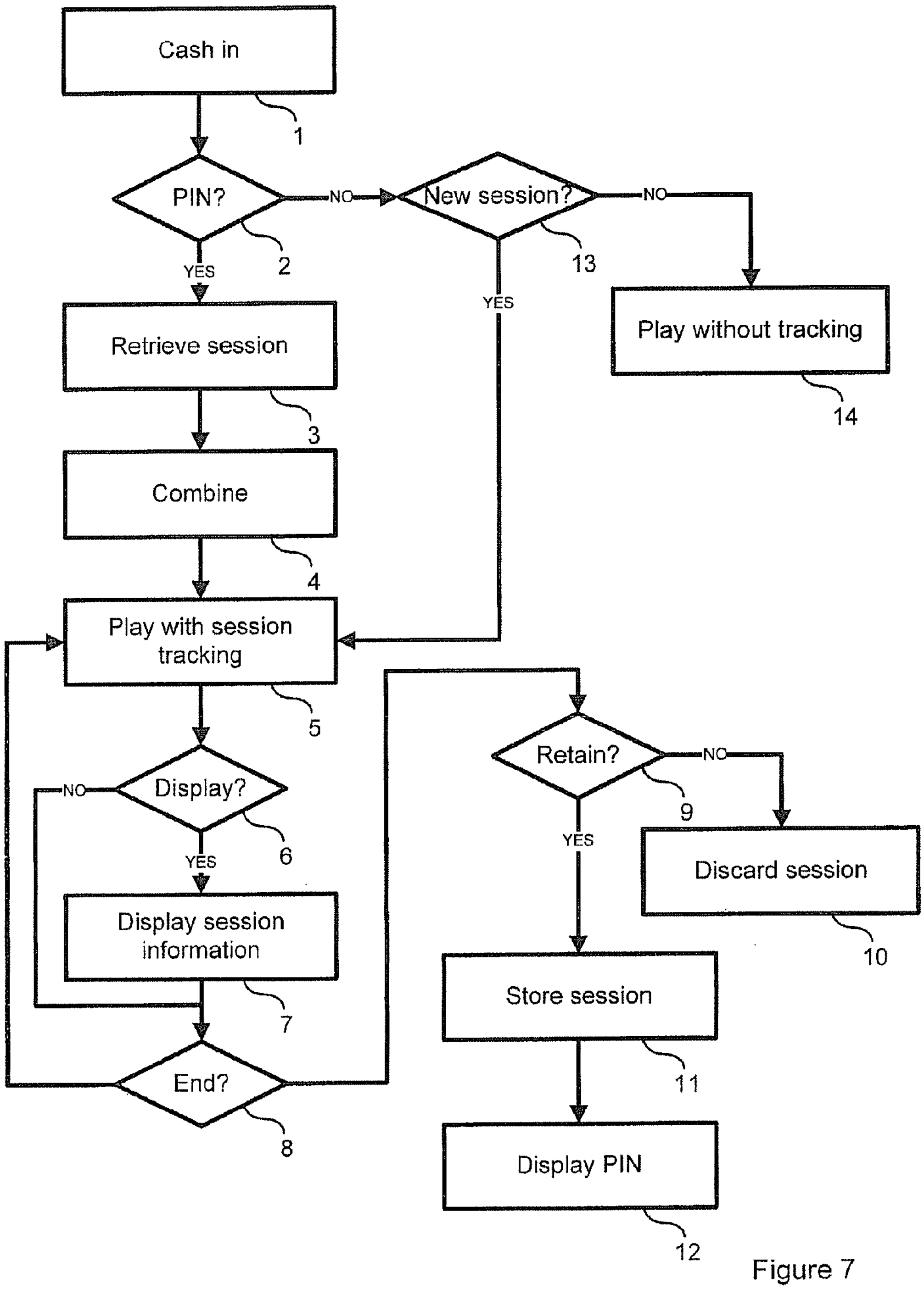
FIG. 7: shows a flow diagram of a process performed in accordance with an embodiment of the present invention.

FIG. 7 shows a flow diagram of a method implemented by the gaming system 200 in accordance with the embodiment where the gaming console 114 provides a PIN to a player who wishes to retain their session. In step 1*a* player cashes in to a gaming machine 100 by providing funds for game play. The gaming machine 100 may display on a display 106 a query as to whether the player has a session PIN (step 2).

If the player does have a PIN to enter, the gaming machine 100 may display on a display a keypad and receive inputs from a touch screen 107 indicating a PIN (step 3). The process will include steps to deal with invalid PINs, such as the display of error messages, and perhaps culminating in an alert being sent to an attendant of the gaming venue. The particular process used to deal with invalid PINs does not form a part of the present invention and therefore is not described herein.

When a valid PIN is received, the gaming machine 100 communicates this to the gaming floor management server 208. The gaming floor management server 208 examines a database of PINs and retrieves session information (step 3). This information is then communicated back to the gaming machine 100, which combines this information with the current session information, if any.

In step 5 the player plays a game on the gaming machine 100. During this play the gaming machine 100 monitors the game play, recording sufficient information to enable the formation of the session information. In steps 6 and 7 the gaming machine 100 monitors the user interface 115 for an input indicating that the session information is required to be displayed and if such an input is received the current session information is displayed on a display 106, or on the display 116 if provided.

In step 8 the gaming machine 100 monitors for an end session event, which is typically a cash out command. When this occurs, the gaming machine 100 displays on a display 106 or secondary display 116 a query whether the player wishes to retain the session information (step 9). If the player indicates that the session information is not to be retained, then the session is discarded in step 10. If the player indicates that the session is to be retained, then it is stored (step 11) and a PIN displayed (step 8), which may be the same as or different to any PIN entered in step 2. To store the session, the gaming machine 100 sends the session information to the gaming floor management server 208, which stores it in a database together with the PIN. The PIN may be generated either by the gaming machine 100 or on request from a gaming machine 100 by the gaining floor management server 208.

While the foregoing description has been provided by way of example of the preferred embodiments of the present invention as presently contemplated, which utilise gaming machines of the type found in casinos, those skilled in the relevant arts will appreciate that the present invention also may have application to internet gaming and/or have application to gaming over a telecommunications network, where handsets are used to display game outcomes and receive player inputs.

Where in the foregoing description reference has been made to integers having known equivalents, then those equivalents are hereby incorporated herein as if individually set forth.

Those skilled in the relevant arts will appreciate that modifications and additions to the embodiments of the present invention may be made without departing from the scope of the present invention.

It will be understood that the invention disclosed and defined in this specification extends to all alternative combinations of two or more of the individual features mentioned or evident from the text or drawings. All of these different combinations constitute various alternative aspects of the invention.

The invention claimed is:

1. A method of tracking session information for each of a plurality of games conducted on a plurality of gaming machines, the method including:
- identifying a player, using a first player tracking module of a first gaming machine of the plurality of gaming machines, prior to play of a first game, of the plurality of games, conducted on the first gaming machine;
- establishing a first credit balance using at least one of a card reader and a ticket reader of the first gaming machine, wherein the first credit balance is reduced according to wagers by the player in exchange for play of the first game;
- monitoring, by a first processor of the first gaming machine, play by the player to generate first session information;
- presenting, on the first gaming machine when play of the first game ends, an option to the player to retain the first session information;
- receiving, at the first gaming machine when play of the first game ends, a player selection to retain the first session information;
- providing the player an identifier associated with the first session information;
- establishing a second credit balance using at least one of a card reader and a ticket reader of a second gaming machine of the plurality of gaming machines, wherein the second credit balance is reduced according to wagers by the player in exchange for play of a second game, of the plurality of games, conducted on the second gaming machine;
- monitoring, by a second processor of the second gaming machine, play by the player of the second game to generate second session information, wherein the player is unidentified prior to play of the second game;
- receiving, using a second player tracking module associated with the second gaming machine, the identifier associated with the first session information, after play of the second game begins; and
- combining the first session information and the second session information upon receipt of the identifier.

2. The method of claim 1, wherein the identifier is an identification number, and the method further comprising providing the identification number to the player.

3. The method of claim 2, and further comprising displaying the identification number on a display of the first gaming machine.

4. The method of claim 1, wherein the first session information includes at least one of:
- cash in,
- credits played,
- credits won,
- session win,
- session loss,
- cash out,
- session start time, and
- total time played.

5. The method of claim 1, wherein the first player tracking module of the first gaming machine is configured to receive player identification information of the player using a card reader of the first gaming machine, wherein the card reader is further configured to receive credit input for establishing the first credit balance.

6. The method of claim 1 further comprising:

transmitting the first session information and the identifier from the first gaming machine to a server for storage; and receiving the first session information at the second gaming machine in response to a request based on the identifier received by the second player tracking module of the second gaming machine.

7. A gaming system, comprising:

a first gaming machine comprising:

a first player tracking module configured to identify a player prior to play of a first game;

at least one of a card reader and a ticket reader configured to receive credit input for establishing a first credit balance, the first credit balance reduced according to a wager by the player in exchange for play of the first game; and a first processor configured to:

execute executable instructions for conducting the first game;

monitor play of the first game by the player to generate first session information;

present the player an option to retain the first session information;

transmit the first session information and an identifier associated therewith to a server for storage upon receipt of a player selection to retain the first session information; and provide the player the identifier; and a second gaming machine comprising:

a second player tracking module configured to receive the identifier after play of a second game begins;

at least one of a card reader and a ticket reader configured to receive credit input for establishing a second credit balance, the second credit balance reduced according to a wager by the player in exchange for play of the second game; and a second processor configured to:

execute executable instructions for conducting the second game;

monitor play of the second game by the player to generate second session information; and combine the first session data and the second session data upon receipt of the identifier at the second player tracking module.

8. The gaming machine of claim 7, wherein the identifier is a PIN.

9. The gaming system of claim 7, wherein the first processor is further configured to generate session data including credits played based on monitoring play of the first game by the player.

10. The gaming system of claim 7, wherein the second processor is further configured to receive the first session information from the server in response to a request for the first session information based on the identifier.

11. A gaming system, comprising:

a first gaming machine comprising:

a first player tracking module configured receive player identification information of a player prior to play of a first game;

at least one of a card reader and a ticket reader configured to receive credit input for establishing a first credit balance, the first credit balance reduced according to a wager by the player in exchange for play of the first game; and a first processor configured to:

present the player an option to track play of the first game prior to beginning play of the first game by the player;

execute executable instructions to conduct the first game;

monitor play of the first game by the player to generate first session information; and transmit the first session information and the player identification information to a server for storage; and a second gaming machine comprising:

a second player tracking module configured to receive the player identification information prior to play of a second game;

at least one of a card reader and a ticket reader configured to receive credit input for establishing a second credit balance, the second credit balance reduced according to a wager by the player in exchange for play of the second game; and a second processor configured to:

present the player an option to track play of the second game prior to beginning play of the second game by the player;

execute executable instructions to conduct the second game;

monitor play of the second game by the player to generate second session information; and combine the first session information and the second session information.

* * * * *